(12) United States Patent
Jarasson

(10) Patent No.: US 10,632,974 B2
(45) Date of Patent: Apr. 28, 2020

(54) WINDOW WIPING DEVICE COMPRISING MEANS FOR LIMITATION OF A CURVATURE ACQUIRED BY A FLEXIBLE WASHING LIQUID FEED TUBE

(71) Applicant: Valeo Systèmes d'Essuyage, Le Mesnil Saint Denis (FR)

(72) Inventor: Jean-Michel Jarasson, Le Mesnil St Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 409 days.

(21) Appl. No.: 13/718,074

(22) Filed: Dec. 18, 2012

(65) Prior Publication Data

US 2013/0152322 A1 Jun. 20, 2013

(30) Foreign Application Priority Data

Dec. 19, 2011 (FR) ...................................... 11 61898

(51) Int. Cl.
*B60S 1/52* (2006.01)
*B60S 1/34* (2006.01)
*B60S 1/48* (2006.01)

(52) U.S. Cl.
CPC ............. *B60S 1/524* (2013.01); *B60S 1/3409* (2013.01); *B60S 1/522* (2013.01); *B60S 1/488* (2013.01)

(58) Field of Classification Search
CPC ........ B60S 1/524; B60S 1/522; B60S 1/3415; B60S 1/3409; B60S 1/487; B60S 1/488

USPC .............. 15/250.04, 250.351, 250.352, 15/250.01–250.03
See application file for complete search history.

(56) References Cited

U.S. PATENT DOCUMENTS

| | | | | |
|---|---|---|---|---|
| 2,185,741 A * | 1/1940 | Sorg | .......................... | F16L 35/00 138/110 |
| 3,827,101 A * | 8/1974 | Wubbe | .................... | B60S 1/522 15/250.04 |
| 3,906,582 A * | 9/1975 | Graczyk | ................. | B60S 1/522 15/250.04 |
| 6,934,992 B2 * | 8/2005 | Sato | ....................... | B60S 1/3415 15/250.04 |
| 8,621,705 B1 * | 1/2014 | Valeanu | .................. | B60S 1/524 15/250.001 |
| 2002/0053112 A1 * | 5/2002 | Ohyama | ................... | B60S 1/38 15/250.43 |
| 2004/0226127 A1 * | 11/2004 | Kaplan | ................... | B60S 1/488 15/250.04 |

* cited by examiner

*Primary Examiner* — Gary K. Graham
(74) *Attorney, Agent, or Firm* — Osha Liang LLP

(57) ABSTRACT

Window wiping device for a motor vehicle comprising at least one link (2, 3), a mobile arm (6) adapted to be mounted on the vehicle by said link (2, 3) and effect an angular to-and-fro movement (A), a flexible washing liquid feed tube (16), rigidly fastened to said mobile arm (6), which device is characterized in that it further comprises a means (20) for limitation of a curvature assumed by said flexible feed tube (16) configured to surround the flexible feed tube (16) so as to prevent it cracking.

9 Claims, 2 Drawing Sheets

WINDOW WIPING DEVICE COMPRISING MEANS FOR LIMITATION OF A CURVATURE ACQUIRED BY A FLEXIBLE WASHING LIQUID FEED TUBE

The present invention concerns the technical field of window wiping devices for a motor vehicle.

It is known that a motor vehicle is routinely equipped with a wiping device for wiping a window, for example its windscreen, and thus to prevent distortion of the driver's view of their environment.

Such a wiping device comprises at least one link or bar, adapted to be mounted on the vehicle and to be driven by an actuating system of the vehicle, and a mobile wiping arm, adapted to be mounted on said link and to effect an angular to-and-fro movement. The mobile arm carries a squeegee blade, also called a wiper, produced in an elastic material, that rubs against the window and evacuates water out of the field of view of the driver. The mobile arm comprises a structure and a rod, called a driver, adapted to fix the mobile arm to the link and mounted on the structure by a transverse shaft that allows their relative rotation.

In order to feed a washing liquid onto the windscreen of the vehicle, there is known a wiping device further comprising a washing liquid feed tube comprising one or more pipes. The washing liquid is fed via the feed tube from a tank of a distribution device situated in the vehicle and sprayed in the direction of a window of the vehicle by nozzles situated on the mobile arm or on the wiper. The feed tube is thus connected, on the one hand, to the washing liquid distribution device of the vehicle and, on the other hand, to the mobile arm of the wiping device.

Such a feed tube is made from a flexible material so as to be able to assume a curvature when the mobile arm of the wiping device on which it is fixed effects an angular to-and-fro movement.

However, such a repeated to-and-fro movement of the mobile arm leads to a plurality of repeated elongations and compressions of the feed tube in at least one localized area of the tube, for example in its most curved portion, and such loading can cause premature wear that can provoke cracking or even breaking of the feed tube.

An object of the invention is to remedy these drawbacks, notably by providing a solution that is relatively inexpensive, simple and easy to assemble.

To this end, it consists in a window wiping device for a motor vehicle comprising at least one link, a mobile arm driven in rotation by said link to effect an angular to-and-fro movement, a flexible washing liquid feed tube, rigidly fastened to said mobile arm, and means for limitation of a curvature assumed by said flexible feed tube configured to surround the flexible feed tube so as to prevent the flexible feed tube from cracking.

Such a limitation means is important notably by reason of the fact that the flexible feed tube can comprise elements such as one or more heating electrical wires. It is important not to risk cutting these wires to limit all risk of deterioration of the vehicle.

According to one aspect of the invention, the limitation means has a profile that allows movement according to the curvature in a single plane, this profile preventing any movement in separate planes converging on the single plane.

Thus the limitation means is adapted to prevent repeated bending of the feed tube leading to cracking or breaking of the tube. In other words, such limitation means limits the curvature of the tube so that it is greater than a particular threshold value liable to lead to cracking or breaking.

The limitation means advantageously surrounds the most curved portion of the feed tube. By the term "most curved portion" is meant the area of the feed tube between the mobile arm and the link at the level of which the tube is curved so as substantially to form a U. The limitation means of the tube is thus adapted to prevent deformation or bending of the feed tube in the portion of the tube with the greatest risk of cracking or breaking.

According to one feature of the invention, the limitation means takes the form of an elongate element around the flexible feed tube and deformable transversely to its length. A single element has the advantage of being easy to mount on the feed tube. The deformability of the elongate element transversely to its length enables it to be deformed regularly at any point along its length, i.e. progressively, to accompany the transverse movements of the feed tube caused by the to-and-fro movements of the mobile arm.

According to one aspect of the invention, the elongate element has two ends, one of said ends being fixed to an element of the mobile arm. The mobile arm advantageously comprises a main element and a driver connected to at least one link. The driver connects the mobile arm to a pivot shaft of said mobile arm. In this case one end of the elongate element is fixed to the main element or to its driver.

According to one aspect of the invention, one end of the elongate element is fixed to one of the links of the device.

The fixing of the ends of the elongate element prevents on the one hand movements of the mobile arm, for example, outside a portion of the tube liable to be bent repeatedly and on the other hand enables better absorption or limitation of the deformations of the feed tube over all of the extension length of the elongate element.

The elongate element is advantageously extensible. Such an elongate element thus extends or stretches as a function of loads to which it is submitted by the deformations of the feed tube accompanying the to-and-fro movements of the mobile arm. Such an elongate element may for example take the form of a tubular net or a coil spring.

According to one aspect of the invention, the elongate element therefore comprises turns so as to feature a plurality of spaces between the turns when it is curved. By virtue of its plurality of turns, such an element with turns further makes it possible to confer on the feed tube both sufficient stiffness to prevent cracking and sufficient flexibility to prevent the stresses induced by the to-and-fro movements of the mobile arm propagating to other portions of the feed tube, for example, at the level of the points of attachment of the feed tube to the distribution device and to the mobile arm, respectively, which could also lead to cracking or breaking of the feed tube at these locations.

According to one feature of the invention, the elongate element takes the form of a coil spring. A coil spring of this kind is of relatively low cost, easy to manufacture and to mount around the feed tube given that it is constituted only of an extensible helical element. A coil spring of this kind may be formed from a plastic material or from metal. A coil spring of this kind, by virtue of its plurality of consecutive turns, further makes it possible to track regularly, at the level of each turn, the deformations of the feed tube. A coil spring of this kind, by virtue of its plurality of consecutive turns and thus its transverse flexibility, is further not liable to jamming that could interfere with correct operation of the wiping device of the vehicle. A coil spring of this kind can furthermore be easily fixed to the wiping device at its two ends, so that the deformations of the feed tube caused by the to-and-fro movements of the mobile arm are absorbed by the coil spring in the transverse direction.

In one embodiment of the invention, the coil spring is fixed, on the one hand, by one of its ends, to a link of the wiping device and, on the other hand, by its other end, to the driver of the wiping device.

According to one feature of the invention, the feed tube is, for example, formed of a plastic material.

According to one aspect of the invention, the washing liquid feed tube comprises at least one pipe and advantageously two pipes, and one of the pipes, a plurality of the pipes or all of the pipes can be surrounded by the limitation means.

According to another aspect of the invention, the feed tube comprises heater means, notably embedded in the material constituting the tube or installed in the pipe or pipes.

The invention also consists in an assembly comprising a tube for feeding a liquid for washing a window of a motor vehicle and a limitation means as defined hereinabove.

Other features and advantages of the invention will become apparent in the course of the following description given with reference to the appended drawings, which are provided by way of nonlimiting example and in which identical references are assigned to similar objects.

Figure 1:
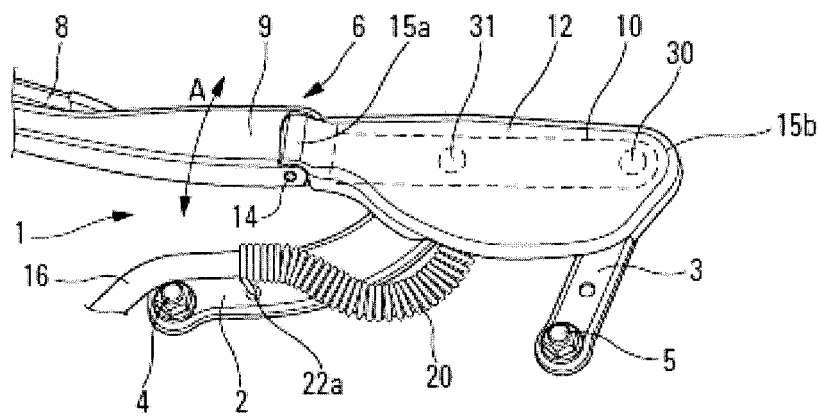
FIG. 1 represents a partial perspective view of a wiping device of the invention.

The wiping device 1 represented in FIG. 1 comprises a first link 2 and a second link 3 adapted for mounting the wiping device 1 on a motor vehicle, not shown, by two mechanical connections 4 and 5, respectively, here of the nut-and-bolt type.

The links 2 and 3 are coupled, at the level of the nut-and-bolt systems 4 and 5, to an actuating system, not shown, adapted to drive them in rotation.

These mobile links 2 and 3 are adapted, when they move, to drive a mobile arm 6 with an angular to-and-fro movement A, so as to wipe a window of the vehicle, such as its windscreen, for example, adjacent to which the wiping device 1 is mounted.

The mobile arm 6 comprises a first element 9, called the "main element", and a second element 10, called the "driver". The driver 10 connects the main element 9 to a pivot point 30 of the mobile arm 6; a driver of this kind is represented in dashed outline in FIG. 1.

Here the mobile link 2 takes the form of a curved link the ends of which are rounded. Here the mobile link 3 takes the form of a substantially rectilinear link the ends of which are rounded. The mobile links 2 and 3 can be of metal or plastic material. The shapes referred to above vary according to the vehicle carrying the wiping device.

Figure 2:
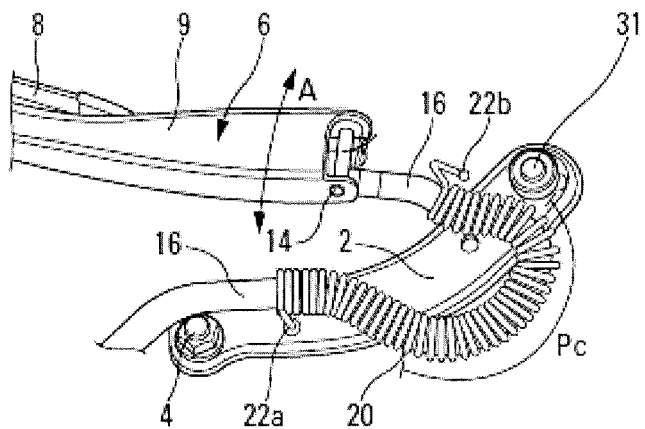
FIG. 2 represents a partial view of the wiping device from FIG. 1 with its cover, its second link and its driver removed, for enhanced visibility.

The main element 9 of the mobile arm 6 receives a wiper 8, comprising a squeegee blade produced in an elastic material that rubs against the window and evacuates water out of the field of view of the driver of the vehicle. As shown in FIGS. 1 and 2, the wiper 8 is mounted at a free end of the main element 9 opposite the end of said main element 9 receiving the driver 10.

Here the driver 10 takes the form of a rod. A cover 12 covers the driver 10. The driver 10 is notably connected to the pivot point 30 of the wiping arm and to the links 2 and 3, by the pivot point 30 in the case of the second link 3 and by an articulation point 31 in the case of the first link 2. The pivot point 30 and the articulation point 31 are pivot connections, for example.

The driver 10 is mounted on the main element 9 by a transverse shaft 14 that allows their relative rotation so as to allow, or not, contact of the wiper 8 with the window of the vehicle, notably so as to be able to lift the squeegee blade off the window, for example to replace it.

Here the main element 9 of the mobile arm 6 takes the form of an elongate structure the base of which is hollow and adapted to receive at a first end the wiper 8 and at a second end the driver 10 and a portion of the cover 12.

The cover 12 takes the form of an elongate part partially covering the driver 10 so as to conceal the mechanical connections fixing the driver 10 to the links 2 and 3 and to protect users from the risk of pinching their fingers. The cover 12 has a substantially plane shape comprising one end 15a for fixing it to the mobile arm 6 and a partially rounded end 15b partially covering the second link 3. The end 15a of the cover 12 is more particularly fixed at the level of the transverse shaft 14 and therefore at the level of the connection between the main element 9 and the driver 10.

Figure 3:
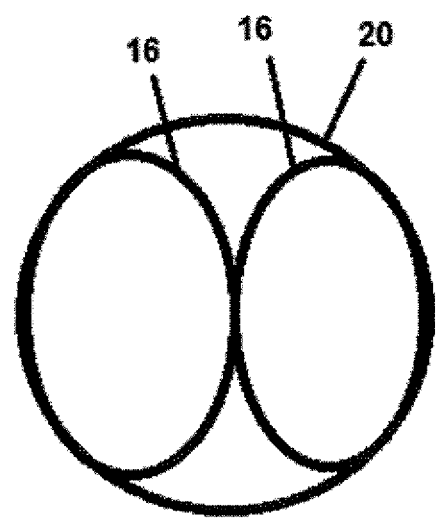
FIG. 3 represents a cross-sectional view of a washing liquid feed tube according to one or more embodiments of the invention.

In order to feed the washing liquid onto a window of the vehicle, the wiping device 1 comprises a washing liquid feed tube 16 comprising at least one single pipe. According to one or more embodiments, the feed tube 16 comprises two pipes, as shown in FIG. 3. The washing liquid is fed via the feed tube 16 from a tank of a distribution device, not shown, situated in the vehicle, and is then sprayed in the direction of the window of the vehicle by nozzles situated on the wiper 8. Thus the feed tube 16 is connected, on the one hand, to the washing liquid distribution device of the vehicle and, on the other hand, to the mobile arm 6 to which it is rigidly fastened.

The feed tube 16 is constituted of a flexible material, such as for example a plastic material, an elastomer or an ethylene-propylene-diene monomer (EPDM), so that it can bend when the mobile arm 6 of the wiping device 1 effects an angular to-and-fro movement.

As shown in FIGS. 1 and 2, a means for limitation of a curvature assumed by the flexible feed tube 16 is mounted on said tube. Here the limitation means takes the form of an elongate element and to be more precise a coil spring 20 around the flexible feed tube 16 so as to retain it and to prevent it from cracking as a consequence of repeated deformations caused by the to-and-fro movements of the mobile arm 6. This embodiment is of course not limiting on the scope of the present invention in that the limitation means could take the form of a tubular net, a sheath, an element comprising one or more consecutive or non-consecutive turns, or any other structure having the functional features specific to the present invention.

The coil spring 20 can be of metal, plastic material, rubber or any material or alloy suitable for constituting a coil spring of this kind.

As shown in FIG. 2, the coil spring 20 surrounds the feed tube 16 over its most curved portion Pc, which is a portion where there is a high risk of cracking or breaking as a consequence of deformations caused by the to-and-fro movements of the mobile arm 6. Here, as shown in FIG. 2, this portion Pc corresponds to the area of the feed tube between the mobile arm 6 and the first link 2 at the level of which the feed tube 16 is curved so as substantially to form a U.

The coil spring 20 is deformable, here by virtue of its turns, both transversely to its length and lengthwise, i.e. in the latter case it is extensible. The coil spring 20 is thus adapted to be deformed at any point along its length, i.e. progressively, as shown in FIGS. 1 and 2, notably in the portion Pc, at the level of which the turns are spread apart from each other progressively, to accompany the transverse movements of the feed tube 16 caused by the to-and-fro movements of the mobile arm 6.

The coil spring 20 has two ends 22a and 22b. The distal end 22a, relative to the mobile arm 6, is fixed to the first link 2 of the wiping device 1 here and the proximal end 22b is fixed to the driver 10 here. FIG. 2 showing a partial view of the wiping device 1 with the driver 10, the cover 12 and the second mobile link 3 removed, for improved visibility, the end 22b is shown "floating" in this figure.

Of course, either end of the coil spring 20 could be fixed at any point on these elements or on another element of the wiping device 1 such as the cover 12 or the main element 9 of the mobile arm 6.

In one embodiment of the invention, the feed tube 16 further comprises heating means embedded in the material constituting the tube or installed in the pipe or pipes so as to heat the washing liquid.

When the wiping device 1 is operating, the angular to-and-fro movement A of the mobile arm 6 causes movement and deformation of the feed tube 16. The coil spring 20, fixed by its ends to the first link 2 and to the mobile arm 6, and surrounding the most curved portion of the feed tube 16, enables the deformations of the feed tube 16, i.e. the curvature assumed by the feed tube 16 to be limited so that the latter curvature is greater than a particular threshold value so as to prevent cracking or breaking of the feed tube 16.

The invention claimed is:

1. A window wiping device for a motor vehicle comprising:
    at least one link;
    a mobile arm driven in rotation by the at least one link to effect an angular to-and-fro movement, the mobile arm comprising a main element and a driver connected to the at least one link, the driver connecting the main element to a pivot shaft of the mobile arm;
    a flexible washing liquid feed tube, rigidly fastened to the mobile arm; and
    an elongate element disposed around the flexible washing liquid feed tube for limitation of a curvature assumed by the flexible washing liquid feed tube configured to surround the flexible washing liquid feed tube so as to prevent cracking,
    wherein the elongate element is disposed between the at least one link and the driver and surrounds a most curved portion of the flexible washing liquid feed tube,
    wherein the most curved portion of the flexible washing liquid feed tube, which is surrounded by the elongate element, extends to outside of the mobile arm,
    wherein the elongate element has two ends, one of the two ends being fixed to a first link of the at least one link,
    the other end of the two ends of the elongate element being fixed to one of the main element or to the driver.

2. The device according to claim 1, wherein the elongate element is deformable transversely to a length of the elongate element and deformable regularly at any point along the length to accompany the transverse movements of the flexible washing liquid feed tube caused by the to-and-fro movements of the mobile arm.

3. The device according to claim 2, wherein the elongate element is a coil spring.

4. The device according to claim 1, wherein the elongate element is extensible.

5. The device according to claim 4, wherein the elongate element comprises turns so as to feature a plurality of spaces between the turns when the elongate element is curved.

6. The device according to claim 1, wherein the flexible washing liquid feed tube comprises at least one pipe surrounded by the elongate element.

7. The device according to claim 1, wherein the flexible washing liquid feed tube comprises two pipes surrounded by the elongate element.

8. The device according to claim 1, wherein the flexible washing liquid feed tube comprises heating means embedded in a material constituting the flexible washing liquid feed tube or installed in the flexible washing liquid feed tube.

9. The device according to claim 1, wherein the most curved portion of the flexible washing liquid feed tube, which is surrounded by the elongate element, extends outside an end of the mobile arm.

* * * * *